United States Patent [19]

Steiner

[11] Patent Number: 4,805,302
[45] Date of Patent: Feb. 21, 1989

[54] WIRE STRIPPER

[75] Inventor: Richard A. Steiner, East Haddam, Conn.

[73] Assignee: Rostra Tool Company, Branford, Conn.

[21] Appl. No.: 121,526

[22] Filed: Nov. 17, 1987

[51] Int. Cl.[4] ............................................. H02G 1/12
[52] U.S. Cl. ..................................................... 30/90.1
[58] Field of Search .................. 81/9.4; 30/90.1, 90.4, 30/90.7, 91.2

[56] References Cited

U.S. PATENT DOCUMENTS

| 2,995,052 | 8/1961 | Funcik | 30/90.1 |
|---|---|---|---|
| 3,091,031 | 5/1963 | Grant | 30/90.7 |
| 3,254,407 | 6/1966 | Apa et al. | 30/91.2 |
| 4,640,009 | 2/1987 | Liversidge | 30/90.1 |

FOREIGN PATENT DOCUMENTS

| 119711 | 11/1930 | Austria | 81/9.4 |
|---|---|---|---|
| 735641 | 5/1943 | Fed. Rep. of Germany . | |
| 45149 | 2/1939 | Netherlands | 30/90.1 |
| 607389 | 12/1978 | Switzerland . | |
| 611822 | 11/1948 | United Kingdom | 30/90.1 |

OTHER PUBLICATIONS

Advertisement for Corex wire stripper by Paladin Corporation.

Advertisement for Toggle wire stripper by Paladin Corporation.

*Primary Examiner*—Roscoe V. Parker
*Attorney, Agent, or Firm*—John H. Crozier

[57] ABSTRACT

A wire stripper is provided with a body having mounted therein, in one preferred embodiment, one or more circular cutting blades, selectively positioned to sever one or more layers of an insulated cable. In a preferred embodiment, the body is compact and generally circular. The body has a cable accepting opening generally through its center into which the circular blades partially protrude. The blades are mounted on a slide reciprocatingly moveable back and forth within the body, which slide partially extends outward from the circumference of the body. When the extension of the slide is depressed toward the center of the body, the blades are withdrawn from the cable accepting opening and a cable may be inserted therethrough. The stripper is preferably manually rotated by gripping the outer circumference of the stripper and rotating it about the cable, thus inherently producing a circular cut. The use of circular blades affords substantially longer life than the straight blades used in other types of wire strippers. Different cable diameters can be acocmmodated by opening the body and replacing one or more of the circular blades.

25 Claims, 2 Drawing Sheets

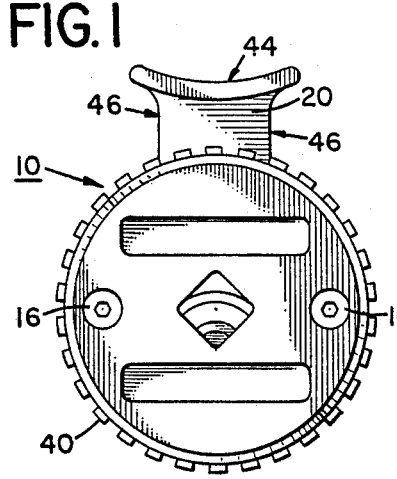
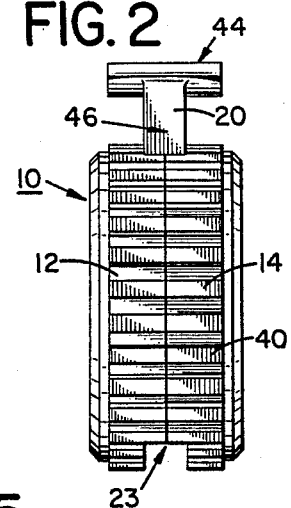
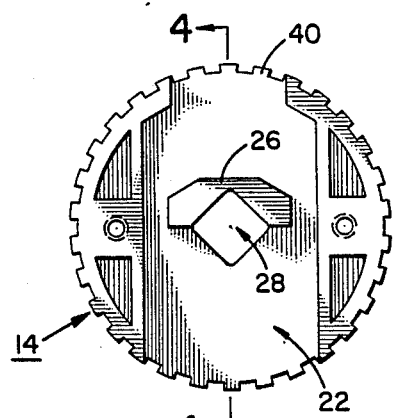
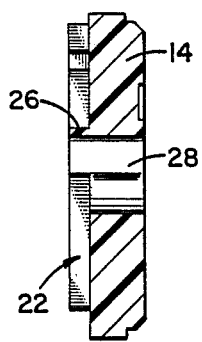
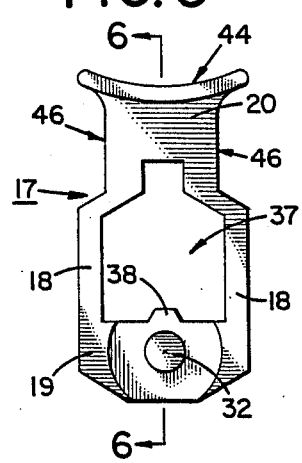
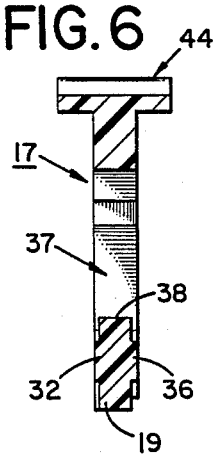
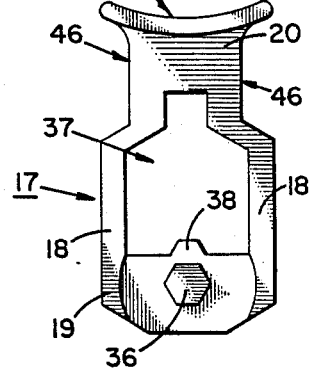
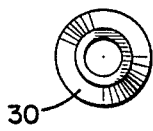
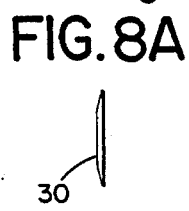
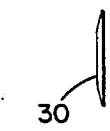
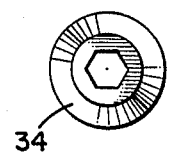
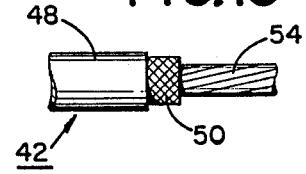
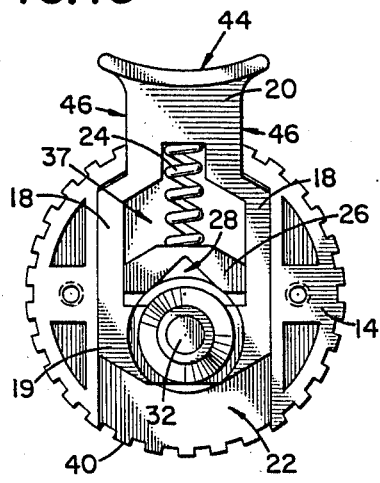
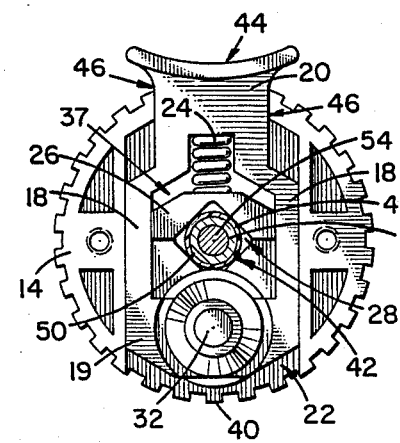
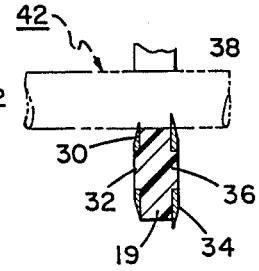

WIRE STRIPPER

BACKGROUND OF THE INVENTION

1. Field of the Invention

This invention relates to wire strippers generally and, more particularly, to a wire stripper that is versatile, long-lasting, convenient to use, and inherently produces circular cuts.

2. Background Art

"Wire" usually refers to a central electrical conductor surrounded by insulation, while "cable" usually refers to a central conductor surrounded by insulation, with a second conductor of foil or braid surrounding the first layer of insulation and a second layer of insulation surrounding the second conductor. "Wire" and "cable" at times may be used herein interchangeably, as will be clear from the context.

One type of wire stripper long known in the art comprises a pair of opposed blades having handles at one end thereof, which handles are pivotally attached together between the blade ends and the handle ends. The blades have opposed, aligned pairs of sharp notches along their lengths such that when the blades are manually urged together, a selected pair of notches closes about, and cuts through, the insulation on a wire. Rotating the stripper in its closed position in a circular motion of at least 180 degrees about the wire in a plane perpendicular to the axis of the wire severs the insulation and allows it to be pulled off the end of the wire. The pairs of notches are variously sized to cut insulation on wires or cables of several different diameters. While this type of stripper is somewhat satisfactory, it is inconvenient to use, in part, because of limitations of a human arm and wrist in rotating the stripper. The number of different diameters which can be accommodated is limited, a fairly unobstructed space around the wire or cable is required, and the cutting edges of the notches have a relatively limited life. A further limitation is that to make two cuts—required, for example, with a cable having a braided or foil sheath under a first layer of insulation—it is necessary to open and reposition the stripper. Additionally, it is difficult to rotate the stripper in a true circle.

Another type of stripper includes a tool having two elongate body parts, pivotally joined at one end and normally latched together. Inserted in the body is a cassette having two or three straight blades adjusted to make cuts of selected depths. To use the stripper assembly, the tool is unlatched, the body parts swung apart, a cable inserted along an axis perpendicular to the plane in which the hinged parts move, and the body closed and latched. A circular opening formed at one end of the body allows insertion of a finger for rotating the tool around the wire to complete the stripping operation. Changing cassettes and blade heights allows a range of cable sizes to be stripped. This system overcomes some of the limitations of the device described above, but at the expense of time lost in the procedure of inserting the cable in the body. A major limitation is that, unless the person using the tool is very careful, there is a tendency to move the tool elliptically rather than circularly, resulting in poor cuts. This is especially a problem when working with small size cables. Additionally, more than a minimum amount of space is required around the cable to perform the cutting motion and the straight blades employed have relatively limited life.

A further type of stripper has straight blades positioned in an aperture at one end of an elongate body, with a finger hole, as above, disposed at the opposite end of the body. The aperture is opened by pulling the end of the body with the finger hole away from the aperture end which allows insertion of the cable. The tool is then rotated around the cable, as above. If a second cut is desired, then the aperture is opened and the cable respositioned for the second cut. The operation is again repeated if a third cut is desired. This stripper has the advantage of ease of insertion of the cable, but requires repositioning for multiple cuts, requires more than a minimum amount of space for operation, its straight blades have a relatively limited life, and each size cable requires a different tool. Also, the stripper tends to produce elliptical cuts.

Accordingly, it is a principal object of the present invention to provide a wire stripper which can accommodate a range of cable diameters.

Another object of the present invention to provide a wire stripper which can make multiple cuts in one step.

A further object of the present invention is to provide a wire stripper which is compact and requires a minimum of space around a cable for the cutting operation.

An additional object of the present invention is to provide a wire stripper into which a cable may be easily inserted in a single step.

Yet another object of the present invention is to provide a wire stripper which has blades having a substantially longer life than straight blades.

Yet a further object of the present invention is to provide a wire stripper which is easily and economically manufactured.

Yet an additional object of the present invention is to provide a wire stripper which inherently produces circular cuts.

Other objects of the present invention will, in part, be obvious, and will, in part, be apparent from the following description and the accompanying Drawing.

SUMMARY OF THE INVENTION

The present invention substantially overcomes the limitations of prior wire strippers by providing a wire stripper with a compact body having mounted therein one or more, preferrably circular, cutting blades positioned to make one or more desired cuts on an insulated cable. In a preferred embodiment, the body is circular and has a cable accepting opening generally through its center into which the blades partially protrude. In the preferred embodiment, the blades are mounted on a slide reciprocatingly moveable back and forth within the body, which slide partially extends outward from the circumference of the body. When the extension of the slide is depressed toward the center of the body, the blades are withdrawn from the cable accepting opening and a cable may be inserted therethrough. The stripper is manually rotated by gripping the outer circumference of the body and rotating the stripper about the cable, inherently producing a circular motion of the blades(s) about the cable. The use of circular blades affords substantially longer life than the straight blades used in other types of wire strippers. Different cable diameters can be accommodated by opening the body and replacing one or more of the circular blades.

BRIEF DESCRIPTION OF THE DRAWING

FIGS. 1 and 2 are front and side elevation views, respectively, of the wire stripper of the present invention.

FIGS. 3 and 4 are front and cross-sectional elevation views of the rear body part of the wire stripper of the present invention.

FIGS. 5, 6, and 7 are front, cross-sectional, and rear elevation views, respectively, of the internal slide member of the wire stripper of the present invention constructed to carry two circular cutting blades.

FIGS. 8, 8A, 9, and 9A are views of the circular cutting blades of the present invention.

FIG. 10 is a front elevation view of the assembled wire stripper of the present invention with the front body part removed and without a cable inserted in the wire stripper.

FIG. 11 is a front elevation view of the assembled wire stripper of the present invention with the front body part removed and with a cable inserted in the wire stripper.

FIG. 12 is a partial view showing two circular cutting blades cutting a cable.

FIG. 13 shows a cable after being cut and stripped with a wire stripper of the present invention having two circular cutting blades.

DESCRIPTION OF THE PREFERRED EMBODIMENT

Figure 14:
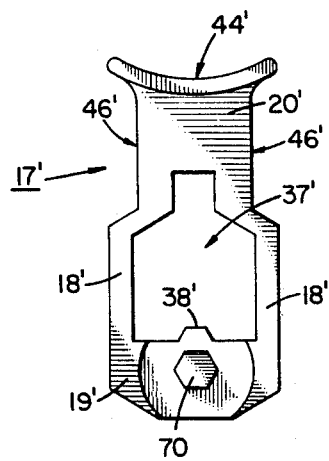
FIGS. 14, 15, and 16 are front, side, and rear elevation views, respectively of the internal slide member of the present invention constructed to carry three circular cutting blades.
Figure 15:
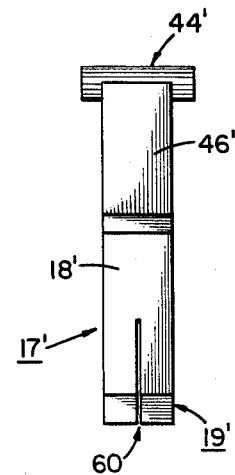
Figure 16:
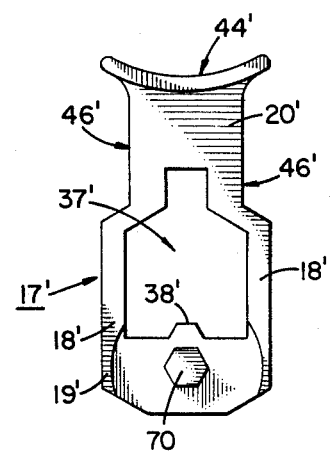

Referring now to the Drawing, a wire stripper of the present invention, generally indicated by the reference numeral 10, includes front and rear body parts 12 and 14, respectively, which may be secured together by screws 16. Moveably disposed within body parts 12 and 14 is a frame-like slide 17 having sides 18 joining a base portion 19 at the lower end thereof and an extension 20 at the upper end thereof. Slide 17 is closely held in channel 22 formed in rear body part 14 and is adapted for up-and-down motion within the channel. Channel 22 and a corresponding channel (not shown) in front body part 12 together form an opening 23 at the bottom of wire stripper 10 so that any cutting debris may fall from the wire stripper. Slide 17 is biased upward by spring 24 which extends between the bottom surface of slide extension 20 and the upper surface of a ledge 26 formed in rear body part 14. An aperture 28 extends through the center of wire stripper 10.

A small circular blade 30 is mounted on a first hub 32 formed on base portion 19 of slide 17 and a large circular blade 34 is mounted on a second hub 36 formed on the base portion of the slide, with the upper parts of both blades normally extending into frame opening 37 and aperture 28. Large circular blade 34 is shown as being adapted to be mounted against rotation on hexagonal second hub 36, but may also be adapted to be mounted on a circular hub; although, it has been found that having the large circular blade fixed is advantageous when the cable being cut has a braid or foil layer which the large circular blade is to cut through. It is also within the intent of the present invention that one or more other blades be mounted against rotation. A flange 38 extends upward from the base portion 19 of slide 17 above hubs 32 and 36. Front and rear body parts 12 and 14 may have ridges formed around the peripheries thereof, as at 40, to aid in gripping the wire stripper.

When a cable 42 is to be stripped, wire stripper 10 is gripped in one hand, a finger is placed on the upper surface 44 of slide extension 20 with pressure thereon and slide 17 is urged downward, thereby clearing circular blades 30 and 34 and flange 38 from aperture 28 so that the cable can be inserted through the aperture the desired distance. The pressure on upper surface 44 is then relieved and spring 24 biases slide 17 upward until large circular blade 34 contacts cable 42. Then, the outer circumference of wire stripper 10 is manually gripped and rotated at least 360 degrees around cable 42. Because of the circular shape of wire stripper 10, a circular cut is inherently produced. When cable 42 is of relatively large diameter, a satisfactory cut may also be produced by placing a finger against one of side surfaces 46 on slide extension 20 and rotating wire stripper 10 around cable 42. During the rotation, large circular blade 34 cuts through outer insulation 48 on cable 42, then through braid or foil layer 50, through inner insulation 52, and then to, but not into, conductor 54. While large circular blade 34 is cutting as described, small circular blade 30 is cutting through outer insulation 48. The depth of cutting of circular blades 30 and 34 is determined and limited by flange 38 contacting outer insulation 48.

While the present invention has been described in an embodiment providing a wire stripper with two circular cutting blades, it is also within the intent of the invention to provide a wire stripper having one or more straight blades, or a single circular blade, or more than two circular blades. In the latter case, in the preferred embodiment for example, the smaller blade could cut through the outer insulation, the middle blade could cut through the braid or foil layer, and the largest blade could cut through the inner insulation. The middle blade could be mounted internally of a split slide with the central axis of the middle blade aligned with the axes of the other two blades; although, it is not necessary for practicing the present invention that the central axes of any number of blades be aligned.

A frame-like slide for wire stripper 10, constructed to carry three circular cutting blades, is shown on FIGS. 14–16 and 20 where it is generally indicated by the reference numeral 17'. Features of slide 17' which are common to slide 17 of FIGS. 5–7 are given primed reference numerals. The major differences between slides 17 and 17' are that there is a longitudinal slot 60 in base portion 19' and an hexagonal opening 62 defined through the base portion.

Figure 17:
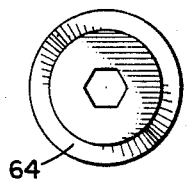
FIGS. 17, 18, and 19 are front elevation views of three circular cutting blades.
Figure 18:
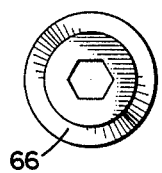
Figure 19:
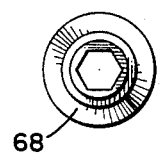
Figure 20:
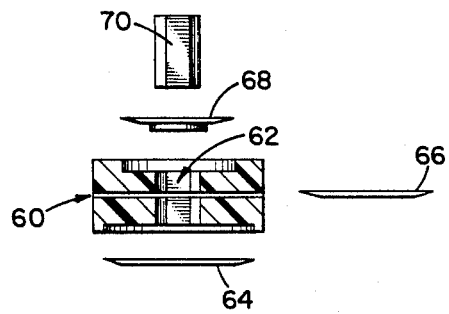
FIG. 20 is a cross-sectional view of the slide of FIGS. 14–16 showing the means of mounting the blades of FIGS. 17–19 in the slide of FIGS. 14–16.

FIGS. 17, 18, and 19 are side elevation views of large, medium, and small circular cutting blades 64, 66, and 68, respectively. FIG. 20 shows how the three blades 64, 66, and 68 are mounted in base portion 19' by means of hexagonal shaft 70 which closely fits hexagonal opening 62, with blades 64 and 68 mounted on opposite sides of the base portion and with medium blade 66 mounted in slot 60 in the base portion.

Figure 21:
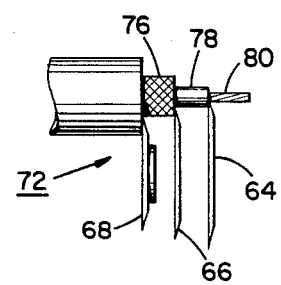
FIG. 21 shows a cable after being cut and stripped with a wire stripper of the present invention having three circular cutting blades.

Operation of slide 17' and blades 64, 66, and 68 is exactly the same as described for slide 17 and blades 30 and 34 above, except for the presence of the third blade, blade 66. The cuts made by blades 64, 66, and 68 are indicated on FIG. 21 where a cable 72 has been cut by wire stripper 10 with the three blades. Blade 68 has cut through an outer insulation layer 74 to a braid or foil layer 76; blade 66 has cut through the braid or foil layer to an inner insulation layer 78; and blade 64 has cut through the inner insulation layer to a conductor 80.

A particular advantage of the present invention is that a circular blade has a substantially longer life than a straight blade, since the length of blade actually employed in the cutting action is perhaps ten times that of a straight blade. When large circular blade 34 is fixed as shown in the Drawing, it may be repositioned, as it wears, by rotating it in 60 degree increments on second hub 36.

Another particular advantage of the present invention is that a range of diameters of cables may be accommodated in the same wire stripper 10 by changing only large circular blade 34. This is possible because such cables have an outer insulation 48 thickness on the order of 0.030 inch. The dimensional relationship of small circular blade 30 and flange 38 can be made such that the small circular blade will always cut about 0.030 inch regardless of the diameter of large circular blade 34.

A major particular advantage of the present invention is that, because of its generally round shape and the fact that it is rotated by grasping the outer circumference of the body, it inherently produces an essentially circular cut.

A further particular advantage of the present invention is that it the basic structural parts thereof, front and rear body parts 12 and 14 and slide 17, may, if desired, be easily and economically manufactured by the injection molding of a thermoplastic. One such thermoplastic that has particularly good properties is 30%-glass-filled polycarbonate. Other suitable materials known in the art may be used as well, the one chosen not being part of the present invention. Spring 24 and circular blades 30 and 34 are easily manufactured or obtained. Wire stripper 10 is simply and easily assembled.

Additional advantages of the present invention are that it is convenient to use, a range of sizes of cables can be accommodated with one device, the cable is easy to insert, the stripper can make multiple cuts simultaneously, and the stripper requires minimum clear space around the cable to be stripped.

It will thus be seen that the objects set forth above, among those made apparent from the preceding description are efficiently attained and, since certain changes may be made in the above construction without departing from the scope of the invention, it is intended that all matter contained in the above description or shown on the accompanying Drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A wire stripper, comprising:
   (a) a generally circular body;
   (b) a first circular cutting blade disposed within said body, said first circular cutting blade being mounted against rotation within said body, but can be manually rotated as the cutting edge of said first circular cutting blade wears;
   (c) means to accept a cable within said body, such that said cable will be disposed generally centrally in said body, said cable having at least one layer surrounding a central core;
   (d) means to bring said circular cutting blade into cutting contact with said cable; and
   (e) rotation of said body may be effected by a person grasping the outer periphery of said body and turning said body in a circular motion around said cable in a plane substantially orthogonal to the axis of said cable;

whereby; when said body is rotated around said cable, said first circular cutting blade will selectively cut through and sever at least one layer of said cable.

2. A wire stripper, as defined in claim 1, wherein said means to accept said cable comprises an aperture formed in said body.

3. A wire stripper, as defined in claim 2, wherein said means to bring said first circular cutting blade into contact with said cable, comprises:
   (a) a channel formed within said body;
   (b) a slide, having a first hub at the lower end thereof for mounting said first circular cutting blade thereon and an extension at the opposite end thereof, said slide being closely and moveably held within said channel for reciprocating up-and-down motion relative to said body; and
   (c) means for biasing said slide upward, such that the edge of said first circular cutting blade protrudes into said aperture.

4. A wire stripper, as defined in claim 3, further comprising:
   (d) said extension extends beyond the periphery of said body; and
   (e) when pressure is applied to said extension to move said slide downward, said first circular cutting blade will clear said aperture to allow insertion of said cable therein.

5. A wire stripper, as defined in claim 4, further comprising:
   (f) ledge means formed on said slide;
   (g) when said pressure on said extension is released to move said slide upward, said first circular cutting blade will cuttingly contact said cable; and
   (h) when said at least one layer of said cable has been severed, said ledge will contact the outer surface of said cable to prevent said blade from cutting through more than said at least one layer.

6. A wire stripper, as defined in claim 1, wherein said body is formed of at least two separable parts to allow access to said first circular cutting blade.

7. A wire stripper, as defined in claim 1, wherein said body is formed of an injection molded thermoplastic.

8. A wire stripper, as defined in claim 3, wherein said slide is formed of an injection molded thermoplastic.

9. A wire stripper, as defined in claim 3, wherein said means for biasing said slide upward comprises a coil spring.

10. A wire stripper, as defined in claim 1, wherein said body has ridges formed around the outer circumference thereof to permit convenient manual grasping thereof.

11. A wire stripper, comprising:
    (a) a generally circular body;
    (b) at least a first cutting blade disposed within said body;

(c) an aperture formed centrally of said circular body to accept a cable within said body, said cable having at least one layer surrounding a central core;

(d)

(e) a channel formed within said body;

(f) a slide, having said at least a first cutting blade mounted at the lower end thereof and having an extension at the opposite end thereof, said slide being closely and moveably held within said channel for reciprocating up-and-down motion relative to said body; and (g) means for biasing said slide upward, such that the edge of said at least a first cutting blade protrudes into said aperture;

whereby; when said body is rotated around said cable in a plane substantially orthogonal to the axis of said cable, said at least a first cutting blade will selectively cut through and sever at least one layer of said cable.

12. A wire stripper, as defined in claim 11, further comprising:

(h) said extension extends beyond the periphery of said body; and (i) when pressure is applied to said extension to move said slide downward, said at least a first cutting blade will clear said aperture to allow insertion of said cable therein.

13. A wire stripper, as defined in claim 12, further comprising:

(j) stop means formed on said slide;

(k) when said pressure on said extension is released to move said slide upward, said at least a first cutting blade will cuttingly contact said cable; and (l) when said at least one layer of said cable has been severed, said stop means will contact the outer surface of said cable to prevent said at least a first cutting blade from cutting through more than said at least one layer.

14. A wire stripper, as defined in claim 13, further comprising:

(m) rotation of said body may be effected by a person grasping the outer periphery of said body and turning said body in a circular motion around said cable.

15. A wire stripper, as defined in claim 11, wherein said means for biasing said slide upward comprises a coil spring.

16. A wire stripper, comprising:

(a) a generally circular body;

(b) at least two circular cutting blades disposed within said body, at least one of said at least two circular cutting blades being mounted against rotation within said body, but can be manually rotated as the cutting edge of said at least one of said at least two circular cutting blades wears;

(c) means to accept a cable within said body, such that said cable will be disposed generally centrally in said body, said cable having at least two layers surrounding a central core;

(d) means to bring said at least two circular cutting blades into cutting contact with said cable; and (e) rotation of said body may be effected by a person grasping the outer periphery of said body and turning said body in a circular motion around said cable in a plane substantially orthogonal to the axis of said cable;

whereby, when said body is rotated around said cable, each of said at least two circular cutting blades will cut through and sever different selected said layers of said cable.

17. A wire stripper, as defined in claim 16, wherein said means to accept said cable comprises an aperture formed in said body.

18. A wire stripper, as defined in claim 17, wherein said means to bring said at least two circular cutting blades into contact with said cable, comprises:

(a) a channel formed within said body;

(b) a slide, having means at the lower end thereof for mounting said at least two circular cutting blades thereon and an extension at the opposite end thereof, said slide being closely and moveably held within said channel for reciprocating up-and-down motion relative to said body; and (c) means for biasing said slide upward, such that the edges of said at least two circular cutting blades protrude into said aperture.

19. A wire stripper, as defined in claim 18, further comprising:

(d) said extension extends beyond the periphery of said body; and (e) when pressure is applied to said extension to move said slide downward, said at least two circular cutting blades will clear said aperture to allow insertion of said cable therein.

20. A wire stripper, as defined in claim 19, further comprising:

(f) ledge means formed on said slide;

(g) when said pressure on said extension is released to move said slide upward, said at least two circular cutting blades will cuttingly contact said cable; and (h) when said selected different said layers of said cable have been severed, said ledge will contact the outer surface of said cable to prevent said at least two blades from cutting through more than said selected different said layers.

21. A wire stripper, as defined in claim 16, wherein said body is formed of at least two separable parts to allow access to said at least two circular cutting blades.

22. A wire stripper, as defined in claim 16, wherein said body is formed of an injection molded thermoplastic.

23. A wire stripper, as defined in claim 18, wherein said slide is formed of an injection molded thermoplastic.

24. A wire stripper, as defined in claim 18, wherein said means for biasing said slide upward comprises a coil spring.

25. A wire stripper, as defined in claim 16, wherein said body has ridges formed around the outer circumference thereof to permit convenient manual grasping thereof.

* * * * *